United States Patent
Yang et al.

(10) Patent No.: US 9,634,292 B2
(45) Date of Patent: Apr. 25, 2017

(54) SEALANT CURING SYSTEM AND A METHOD OF CURING A SEALANT USING THE SAME

(71) Applicant: SHENZHEN CHINA STAR OPTOELECTRONICS TECHNOLOGY CO., LTD., Shenzhen, Guangming (CN)

(72) Inventors: Qingdou Yang, Guangdong (CN); Yawei Liu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 137 days.

(21) Appl. No.: 14/771,001

(22) PCT Filed: May 20, 2015

(86) PCT No.: PCT/CN2015/079354
§ 371 (c)(1),
(2) Date: Aug. 27, 2015

(87) PCT Pub. No.: WO2016/176874
PCT Pub. Date: Nov. 10, 2016

(65) Prior Publication Data
US 2016/0351858 A1 Dec. 1, 2016

(30) Foreign Application Priority Data
May 7, 2015 (CN) .......................... 2015 1 0228988

(51) Int. Cl.
*G02F 1/13* (2006.01)
*G02F 1/1339* (2006.01)
(Continued)

(52) U.S. Cl.
CPC ............ *H01L 51/56* (2013.01); *G02F 1/1303* (2013.01); *G02F 1/1339* (2013.01);
(Continued)

(58) Field of Classification Search
CPC ................ B32B 37/06; B32B 2457/20; B32B 2310/0831; B29C 65/1406;
(Continued)

(56) References Cited

U.S. PATENT DOCUMENTS 9,579,905 * 2/2017 Ko ....................... B41J 11/0015
2005/0126679 A1* 6/2005 Kim ...................... G02F 1/1339 156/64
2016/0193853 A1* 7/2016 Fujisawa ................ B41J 11/002 347/102

FOREIGN PATENT DOCUMENTS

JP 2010098231 A * 4/2010
KR 20110117445 A 4/2013

* cited by examiner

*Primary Examiner* — Mariceli Santiago
(74) *Attorney, Agent, or Firm* — Ladas & Parry LLP (57) ABSTRACT

A sealant curing system and a method of curing a sealant using the same are disclosed. The sealant curing system includes a curing room and a UV light outputting panel. The curing room is used for receiving a display panel having the sealant which is ready to be cured. The UV light outputting panel is used for displaying a sealant curing image according to a preset displaying data, and is used for producing a UV light. The UV light is used for irradiating and curing the sealant of the display panel. The present invention is capable of eliminating a process in which different masks are replaced for display panels of different sizes.

20 Claims, 8 Drawing Sheets

(51) Int. Cl.
  *B29C 65/14* (2006.01)
  *H01L 51/56* (2006.01)
  *G06T 7/00* (2017.01)
  *H01L 51/52* (2006.01)
  *B32B 37/06* (2006.01)
  *B29C 65/48* (2006.01)

(52) U.S. Cl.
  CPC ........ *G06T 7/0004* (2013.01); *H01L 51/5246* (2013.01); *B29C 65/1406* (2013.01); *B29C 65/4845* (2013.01); *B32B 37/06* (2013.01); *B32B 2310/0831* (2013.01); *B32B 2457/20* (2013.01); *G06T 2207/10004* (2013.01)

(58) Field of Classification Search
  CPC ............. B29C 65/1403; B29C 65/4845; G02F 1/1341; G02F 1/1339
  See application file for complete search history.

SEALANT CURING SYSTEM AND A METHOD OF CURING A SEALANT USING THE SAME

BACKGROUND OF THE INVENTION

1. Field of the Invention

The present invention relates to a field of display technology, and more specifically to a sealant curing system and a method of curing a sealant using the same.

2. Description of the Prior Art

In a traditional process for manufacturing a display panel, a sealant in the display panel is generally cured, thereby a liquid crystal layer or an OLED (organic light emitting diode) display element in the display panel is sealed in the display panel.

A traditional technical scheme for curing the sealant is hereunder illustrated generally.

Firstly, the display panel is placed in a sealing room, and a mask is placed between an ultraviolet (UV) light source and the display panel. Then, a sealant in the display panel is irradiated by a UV light, so that the sealant is cured. There is a default environment which conforms to a standard in the sealing room. The contents of water and oxygen in the default environment are in the level of a millionth. A predetermined pattern is contained in the mask to block the UV light from irradiating the active area of the display panel, and the UV light is passed through the mask to the sealant of the display panel.

In practice, at least five problems, as given below, are found by the inventor in the above technical scheme.

(1) A UV lamp tube needs to be changed after the end of the life span of the UV lamp tube since the above UV light source is generally provided by the UV lamp tube, and the life span of the UV lamp tube is generally only about 1200 hours;

(2) Different masks are provided for display panels of different sizes;

(3) The default environment is damaged every time the mask is replaced, and then the default environment must be restored, thus costs will be increased in the process;

(4) A few hours are consumed in restoring the default environment; and (5) The UV light provided by the UV light source has a poor uniformity, and the amount of light irradiating to the different areas of the sealant varies.

As mentioned above, display panels of different sizes require different sized masks in the traditional technical scheme for curing the sealant, thereby making the process more complex, and leading to a longer processing time.

Therefore, there is a need to provide a new technical scheme, so as to overcome the above-mentioned disadvantages.

SUMMARY OF THE INVENTION

An object of the present invention is to provide a sealant curing system and a method of curing a sealant using the same. The present invention is capable of eliminating a process in which different masks are replaced for display panels of different sizes, and reducing processing costs and processing time.

To overcome the above-mentioned disadvantages, the technical schemes of the present invention are hereunder illustrated.

A sealant curing system is provided. The sealant curing system includes: a curing room used for receiving a display panel having a sealant which is ready to be cured; and a UV light outputting panel disposed in the curing room. The UV light outputting panel is used for displaying a sealant curing image according to a preset displaying data, so as to produce a UV light inside the area of the sealant curing image. The UV light is used for irradiating and curing the sealant of the display panel. The sealant curing image corresponds to the pattern of the sealant of the display panel. The UV light outputting panel includes: a scanning line for transferring a scanning signal; a data line for transferring a data signal; and a pixel unit. The pixel unit connects the scanning line and the data line, respectively. The pixel unit is used for displaying the sealant curing image based on the scanning signal and the data signal, as well as producing the UV light. The pixel unit includes: a display element including a negative electrode layer, a positive electrode layer, and a UV organic emitting material layer disposed between the negative electrode layer and the positive electrode layer; and a control switch used for driving the display element based on the scanning signal and the data signal. The sealant curing system further includes a position correcting device. The position correcting device is used for correcting a relative position of the display panel and the UV light outputting panel, so that a shape and a position of a projection obtained by projecting the sealant curing image onto the display panel are correspondingly aligned to a shape and a position of the sealant of the display panel.

In the sealant curing system, the UV organic emitting material layer is formed by a method for doping an organic basic material and a UV light emitting material. The UV light emitting material includes a carbazole-containing UV light emitting material and/or a UV light emitting quinquebiphenyl material.

In the sealant curing system, the pattern and size of the projection obtained by projecting the sealant curing image onto the display panel are the same as the pattern and size of the sealant which is ready to be cured in the display panel.

In the sealant curing system, the sealant curing image is arranged just right facing to the sealant which is ready to be cured in the display panel, and the pattern and size of the sealant curing image are the same as the pattern and size of the sealant which is ready to be cured in the display panel.

A sealant curing system is provided. The sealant curing system includes: a curing room used for receiving a display panel having a sealant which is ready to be cured; and a UV light outputting panel disposed in the curing room. The UV light outputting panel is used for displaying a sealant curing image according to a preset displaying data, so as to produce a UV light inside the area of the sealant curing image. The UV light is used for irradiating and curing the sealant of the display panel. The sealant curing image corresponds to the pattern of the sealant of the display panel.

In the sealant curing system, the UV light outputting panel includes: a scanning line for transferring a scanning signal; a data line for transferring a data signal; and a pixel unit. The pixel unit connects the scanning line and the data line, respectively. The pixel unit is used for displaying the sealant curing image based on the scanning signal and the data signal, as well as producing the UV light.

In the sealant curing system, the pixel unit includes: a display element including a negative electrode layer, a positive electrode layer, and a UV organic emitting material layer disposed between the negative electrode layer and the positive electrode layer; and a control switch used for driving the display element based on the scanning signal and the data signal.

In the sealant curing system, the UV organic emitting material layer is formed by a method for doping an organic basic material and a UV light emitting material.

In the sealant curing system, the UV emitting material includes a carbazole-containing UV light emitting material and/or a UV light emitting quinquebiphenyl material.

In the sealant curing system, the UV light outputting panel includes a power line array. The power line array includes at least two power lines. Each of the power lines connects the pixel unit. Each of the power lines is used for providing a power for the pixel unit. The control switch is used for controlling each of the power lines to provide power for the display element based on the scanning signal and the data signal. The UV organic emitting material layer is used for emitting the UV light when power provided by each of the power lines is received by the display element.

In the sealant curing system, the control switch includes a first thin film transistor switch and a second thin film transistor switch. The first thin film transistor switch connects the display element, the scanning line, and the data line. The second thin film transistor switch connects the display element, each of the power lines, and the first thin film transistor switch. The first thin film transistor switch is used for receiving the scanning signal and the data signal, and is used for controlling the second thin film transistor switch based on the scanning signal and the data signal. The second thin film transistor switch is used for switching on or off a current path between each of the power lines and the display element under the control of the first thin film transistor switch, thereby controlling the UV organic emitting material layer to emit the UV light.

In the sealant curing system, the pattern and size of a projection obtained by projecting the sealant curing image onto the display panel are the same as the pattern and size of the sealant which is ready to be cured in the display panel.

In the sealant curing system, the sealant curing image is arranged just right facing to the sealant which is ready to be cured in the display panel, and the pattern and size of the sealant curing image are the same as the pattern and size of the sealant which is ready to be cured in the display panel.

In the sealant curing system, the sealant curing system further includes a position correcting device. The position correcting device is used for correcting a relative position of the display panel and the UV light outputting panel, so that a shape and a position of the projection obtained by projecting the sealant curing image onto the display panel are correspondingly aligned to a shape and a position of the sealant of the display panel.

In the sealant curing system, the sealant curing system further includes a fixing member. The fixing member is disposed in the curing room. The fixing member is used for fixing the display panel.

A method of curing a sealant by the sealant curing system is provided. The method includes the following steps of: (A) receiving the display panel by the curing room; and (B) displaying the sealant curing image on the UV light outputting panel according to a preset displaying data, so as to produce the UV light inside the area of the sealant curing image. The UV light is used for irradiating and curing the sealant of the display panel. The sealant curing image corresponds to the pattern of the sealant of the display panel.

In the method of curing the sealant by the sealant curing system, after the step (A) and before the step (B), the method further includes the following step of: (C) correcting the relative position of the display panel and the UV light outputting panel by a position correcting device in the sealant curing system, thereby the shape and position of a projection obtained by projecting the sealant curing image onto the display panel being correspondingly aligned to the shape and position of the sealant of the display panel.

In the method of curing the sealant by the sealant curing system, before the step (C) or after the step (C), the method further includes the following step of: (D) fixing the display panel by a fixing member.

In the method of curing the sealant by the sealant curing system, the step B includes the following steps of: (b1) controlling each of the power lines to provide power for the display element by the control switch in the UV light outputting panel based on the scanning signal in the scanning line and the data signal in the data line; and (b2) emitting the UV light by the display element in the UV light outputting panel after receiving power provided by each of the power lines.

In the method of curing the sealant by the sealant curing system, the step b1 includes the following steps of: (b11) receiving the scanning signal and the data signal by a first thin film transistor switch in the control switch, and controlling a second thin film transistor switch in the control switch based on the scanning signal and the data signal; and (b12) switching on or off a current path between each of the power lines and the display element by the second thin film transistor switch under a control of the first thin film transistor switch, thereby controlling each of the power lines to provide power for the display element.

In comparison to the prior art, the present invention is capable of eliminating the process in which the different masks are replaced for the display panels of the different sizes, and reducing the processing costs and the processing time.

The above objectives, and other objectives, features, advantages, and embodiments of the present invention will be better understood from the following description being considered in connection with the accompanied drawings and in which a preferred embodiment of the invention is illustrated by way of example.

DETAILED DESCRIPTION OF THE PREFERRED EMBODIMENTS

The word "embodiment" is used herein to mean serving as an example, instance, or illustration. In addition, the articles "a" and "an" as used in this application and the appended claims should generally be construed to mean "one or more" unless specified otherwise or clear from context to be directed to a singular form.

Figure 1:
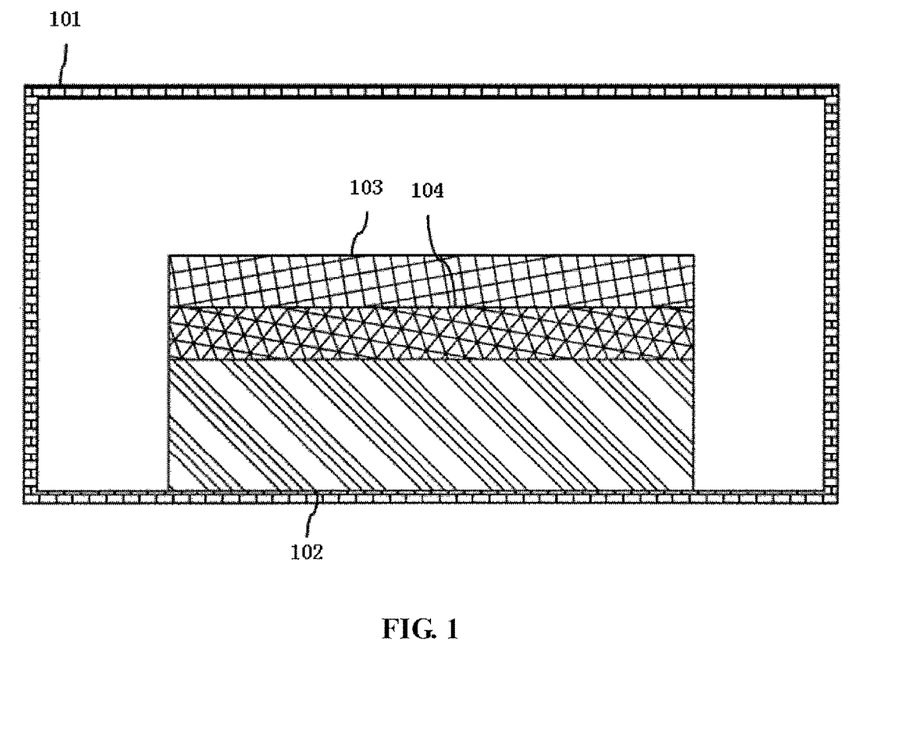
FIG. 1 is a schematic view of a sealant curing system according to a first preferred embodiment of the present invention.
Figure 2:
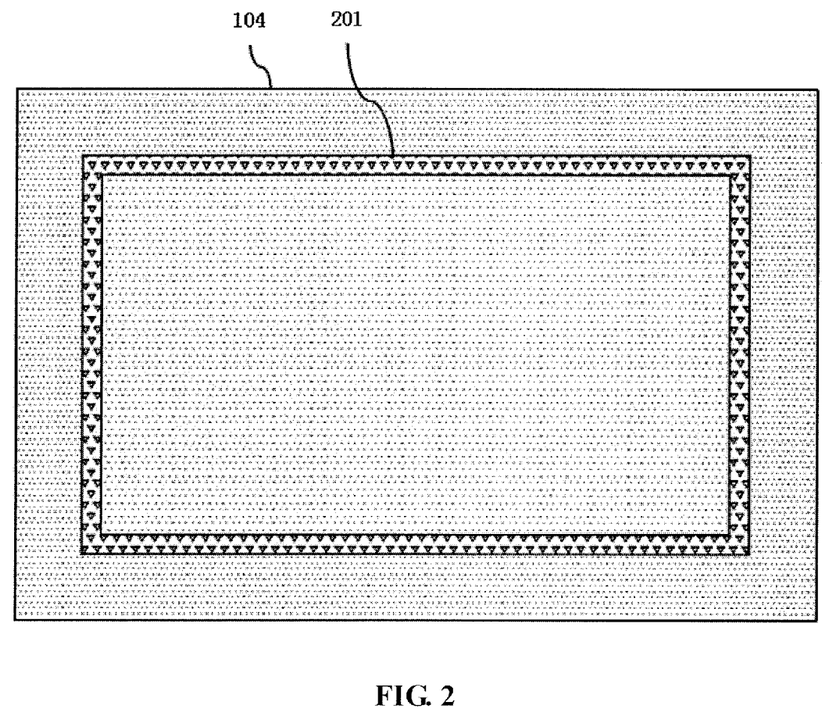
FIG. 2 is a schematic view of a sealant curing image displayed by a UV light outputting panel in FIG. 1.

Please refer to FIG. 1 and FIG. 2. FIG. 1 is a schematic view of a sealant curing system according to a first preferred embodiment of the present invention. FIG. 2 is a schematic view of a sealant curing image 201 displayed by a UV light outputting panel 104 in FIG. 1.

The sealant curing system of the first preferred embodiment of the present invention includes a curing room 101, a fixing member 102, and a UV light outputting panel 104.

The curing room 101 is used for receiving a display panel 103 having a sealant which is ready to be cured. The fixing member 102 is disposed in the curing room 101. The fixing member 102 is used for fixing the display panel 103. The UV light outputting panel 104 is disposed in the curing room 101. The UV light outputting panel 104 is used for displaying a sealant curing image 201 according to a preset displaying data, and is used for producing a UV light corresponding to the sealant curing image 201. The UV light is used for irradiating and curing the sealant 410 of the display panel 103. The sealant curing image 201 corresponds to the pattern of the sealant 410 of the display panel 103.

The UV light outputting panel 104 according to the first preferred embodiment of the present invention can be an organic light emitting diode (OLED), such as an Ultraviolet-OLED (UV-OLED). The display panel according to the first preferred embodiment of the present invention can be a thin film transistor liquid crystal display (TFT-LCD), OLED, or the like.

Figure 3:
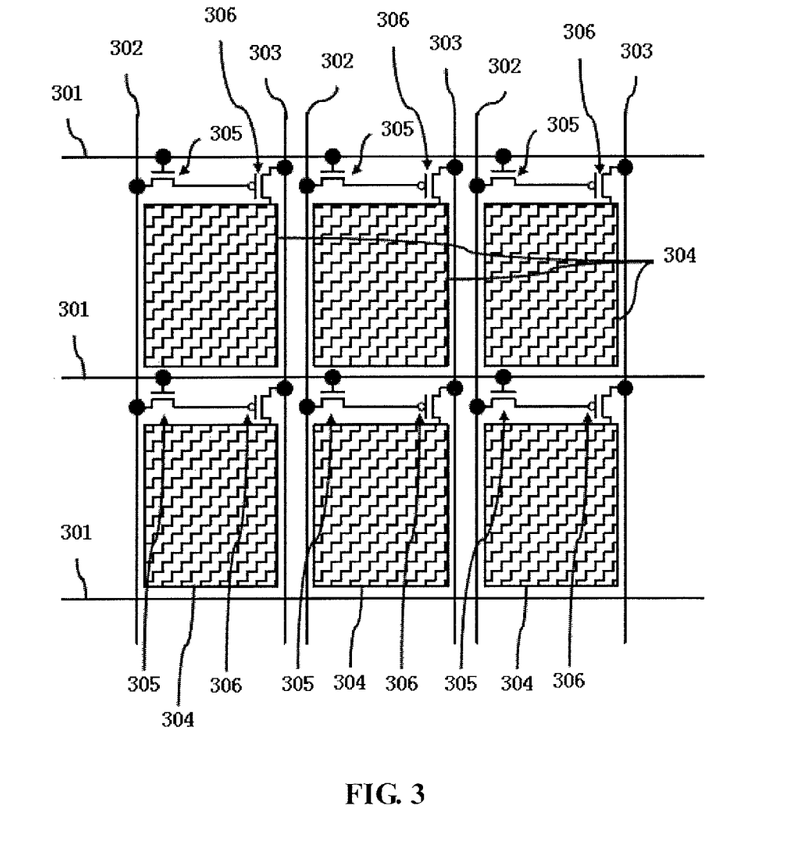
FIG. 3 is a schematic view of the UV light outputting panel of FIG. 1.
Figure 4:
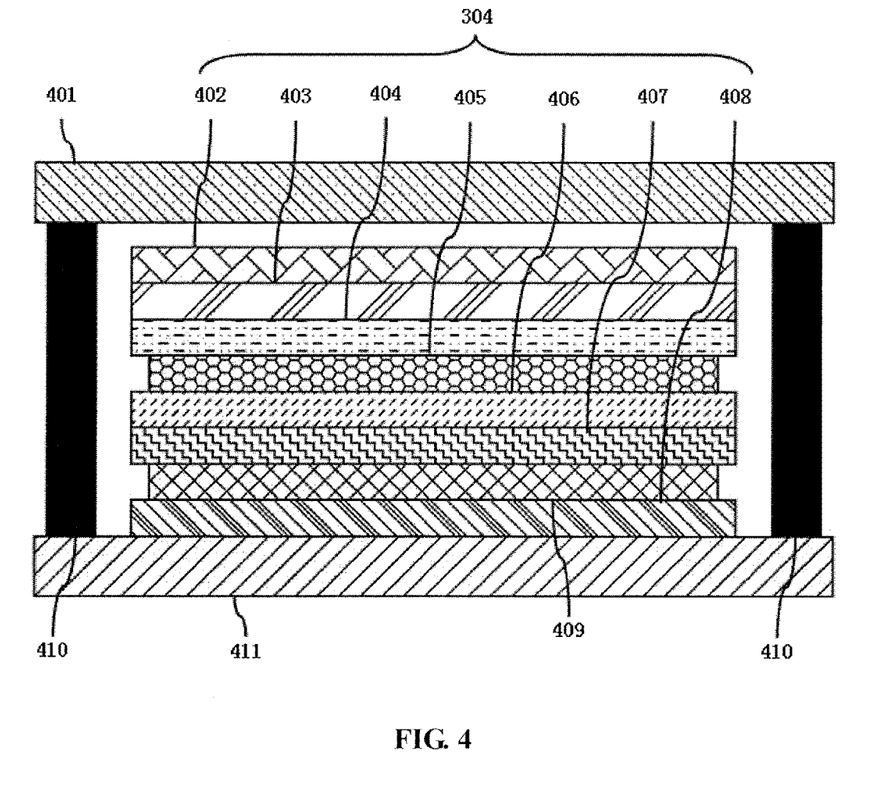
FIG. 4 is a profile view of the UV light outputting panel of FIG. 1.

Please refer to FIG. 3 and FIG. 4. FIG. 3 is a schematic view of the UV light outputting panel 104 of FIG. 1. FIG. 4 is a profile view of the UV light outputting panel 104 of FIG. 1.

In the first preferred embodiment of the present invention, the UV light outputting panel 104 includes a scanning line array, a data line array, a pixel unit array, and a power line array.

The scanning line array includes at least two scanning lines 301. Each of the scanning lines 301 is used for transferring a scanning signal. The data line array includes at least two data lines 302. Each of the data lines 302 is used for transferring a data signal. The pixel unit array includes at least two pixel units. The pixel unit connects the scanning line 301 and the data line 302, respectively. The pixel unit array is used for displaying the sealant curing image 201 based on the scanning signal and the data signal, as well as producing the UV light corresponding to the sealant curing image 201. The power line array includes at least two power lines 303. Each of the power lines 303 connects the pixel unit. Each of the power lines 303 is used for providing a power for the pixel unit.

In the first preferred embodiment of the present invention, the pixel unit includes a display element 304 and a control switch (305 and 306). The display element 304 connects the control switch (305 and 306).

The display element 304 includes a negative electrode layer 402, a positive electrode layer 408, and a UV organic emitting material layer 405. The UV organic emitting material layer 405 is disposed between the negative electrode layer 402 and the positive electrode layer 408. The display element 304 is used for emitting the UV light after power provided by each of the power lines 303 is received by the display element 304. The display element 304 further includes a hole injection layer 407, a hole transport layer 406, an electron transport layer 404, and an electron injection layer 403. The UV organic emitting material layer 405 is disposed between the hole transport layer 406 and the electron transport layer 404. The electron injection layer 403 is disposed between the electron transport layer 404 and the negative electrode layer 402. The hole injection layer 407 is disposed between the hole transport layer 406 and the positive electrode layer 408. A switch element layer 409 corresponding to the control switch (305 and 306) is disposed between the hole injection layer 407 and the positive electrode layer 408. The material of the hole transport layer 406 can be poly(triphenylamine) (Poly-TPD) and the like. The material of the electron transport layer 404 can be 8-Hydroxyquinoline aluminum and the like. The material of the hole injection layer 407 can be PEDOT (polymer made of 3,4-ethylene dioxythiophene monomer) and the like. The material of the electron injection layer 403 can be an amorphous C12A7 electron compound and the like.

The display element 304 and the control switch (305 and 306) are placed in a space enclosed by a cover plate 401, a substrate 411, and the sealant 410.

The control switch (305 and 306) is used for controlling each of the power lines 303 to provide power for the display element 304 based on the scanning signal and the data signal. The UV organic emitting material layer 405 is used for emitting the UV light when power provided by each of the power lines 303 is received by the display element 304.

In the first preferred embodiment of the present invention, the control switch (305 and 306) includes a first thin film transistor switch 305 and a second thin film transistor switch 306. The first thin film transistor switch 305 includes a first gate electrode, a first source electrode, and a first drain electrode. The second thin film transistor switch 306 includes a second gate electrode, a second source electrode, and a second drain electrode.

In the first preferred embodiment of the present invention, the first thin film transistor switch 305 is used for switching on a first current path between the first source electrode and the first drain electrode when the scanning signal is a high level signal, and is used for switching off the first current path when the scanning signal is a low level signal. The second thin film transistor switch 306 is used for switching on a second current path between the second source electrode and the second drain electrode when the data signal is the low level signal, and is used for switching off the second current path when the data signal is the high level signal.

Or the first thin film transistor switch 305 is used for switching on the first current path when the scanning signal is the low level signal, and is used for switching off the first current path when the scanning signal is the high level signal. The second thin film transistor switch 306 is used for switching off the second current path when the data signal is the low level signal, and is used for switching on the second current path when the data signal is the high level signal.

Specifically, the first thin film transistor switch 305 is a NMOS (Negative channel Metal Oxide Semiconductor) transistor, and the second thin film transistor switch 306 is a PMOS (Positive channel Metal Oxide Semiconductor)

transistor. Or the first thin film transistor switch 305 is the PMOS transistor, and the second thin film transistor switch 306 is the NMOS transistor.

The first thin film transistor switch 305 connects the display element 304, the scanning line 301, and the data line 302. The second thin film transistor switch 306 connects the display element 304, each of the power lines 303, and the first thin film transistor switch 305. Specifically, the first gate electrode connects the scanning line 301, the first source electrode connects the data line 302, the first drain electrode connects the second gate electrode, the second source electrode connects each of the power lines 303, and the second drain electrode connects the display element 304.

The first thin film transistor switch 305 is used for receiving the scanning signal and the data signal, and is used for controlling the second thin film transistor switch 306 based on the scanning signal and the data signal. The second thin film transistor switch 306 is used for switching on or off a current path between each of the power lines 303 and the display element 304 under the control of the first thin film transistor switch 305, thereby controlling the UV organic emitting material layer 405 to emit the UV light.

In the first preferred embodiment of the present invention, the UV organic emitting material layer 405 employs a doping structure made of "an organic basic material and a UV light emitting material". That is, the UV organic emitting material layer is formed by a method for doping the organic basic material and the UV light emitting material.

Figure 9:
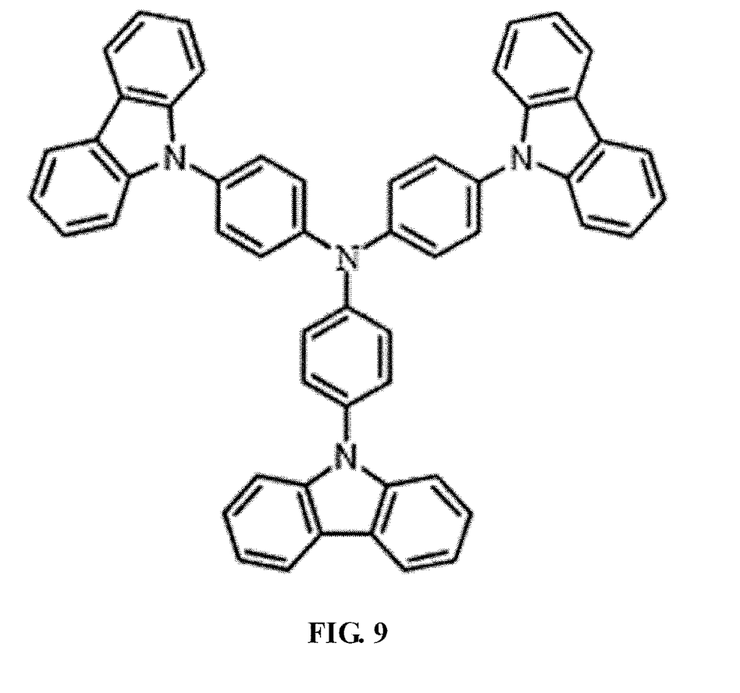
FIG. 9 illustrates a molecular structure of TCTA.
Figure 10:
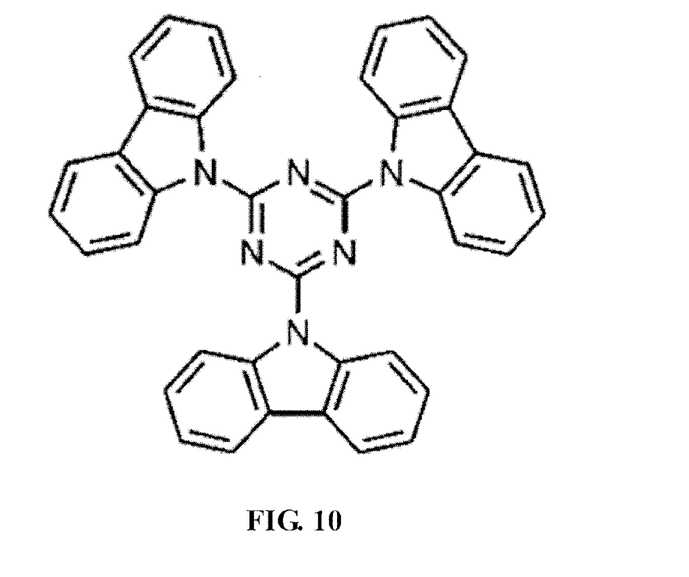
FIG. 10 illustrates a molecular structure of TRZ.

The organic basic material in the combination of "the organic basic material and the UV light emitting material" can be TCTA (4,4',4"-Tri(9-carbazoyl)triphenylamine) (the molecular structure of TCTA as shown in FIG. 9), or can be TRZ (2,4,6-Tricarbazolo-1,3,5-triazin) (the molecular structure of TRZ as shown in FIG. 10).

The UV emitting material includes a carbazole-containing UV light emitting material and/or a UV light emitting quinquebiphenyl material. The band gap of the carbazole-containing UV light emitting material is 3.25 eV, and the peak value of the absorption spectra thereof is in 394 nm. The band gap of the UV light emitting quinquebiphenyl material is 3.48 eV, and the peak value of the absorption spectra thereof is in 310 nm.

Figure 11:
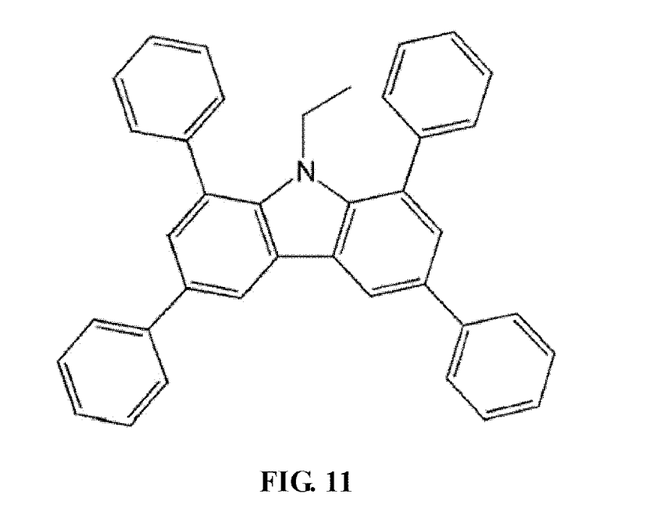
FIG. 11 illustrates a molecular structure of 9-ethyl-1,3,6, 8-tetraphenylcarbazole.
Figure 12:
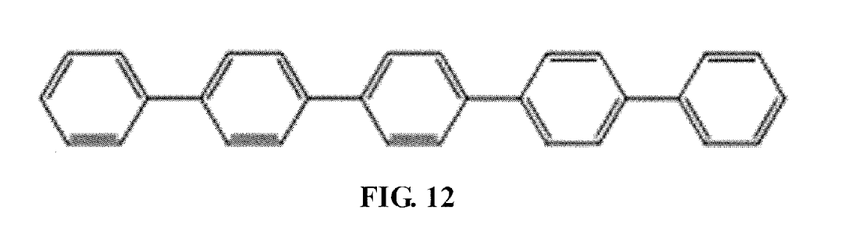
FIG. 12 illustrates a molecular structure of quinquebiphenyl.

Specifically, the carbazole-containing UV light emitting material is 9-ethyl-1,3,6,8-tetraphenylcarbazole, as shown in FIG. 11. The UV light emitting quinquebiphenyl material is quinquebiphenyl, as shown in FIG. 12. The chemical formula of 9-ethyl-1,3,6,8-tetraphenylcarbazole is $C_{38}H_{29}N$. The chemical formula of quinquebiphenyl is $C_{30}H_{22}$.

The sealant curing image 201, which is the same as or corresponds to the pattern and size of the sealant 410 which is ready to be cured in the display panel 103, is displayed by the UV-OLED panel (i.e., the UV light outputting panel 104) based on the pattern and size of the sealant 410 which is ready to be cured in the display panel 103 in the above technical scheme. In the meantime, the UV-OLED panel directly emits the UV light required for curing the sealant 410 on the displaying area which is lighted up of the UV-OLED panel (i.e., the area of the sealant curing image 201), so that the shape and position of a projection obtained by irradiating the UV light onto the display panel are correspondingly aligned to the shape and position of the sealant which is ready to be cured in the display panel, thereby structures such as a UV light source, a mask, and the like in a traditional sealant curing system are completely replaced, thus the structure of the traditional sealant curing system is greatly simplified, and the space occupation thereof is effectively reduced.

A process in which different masks are replaced for display panels of different sizes in the traditional sealant curing system can be eliminated since the sealant curing image 201 displayed by the UV light outputting panel 104 can be freely adjusted by changing the driving condition of the pixel unit based on the pattern and size of the sealant 410 which is ready to be cured in the display panel 103, thereby reducing processing costs (e.g., the costs of the mask and costs required for restoring to a default environment are reduced) and processing time (e.g., time required for replacing the mask and time required for restoring to the default environment are saved).

Also, a distance is separated between the UV light source and the mask/display panel so that the UV light is effectively diffused in order to ensure a UV light produced by the UV light source to be able to cover the whole area of the sealant 410 of the display panel since a traditional UV light source is generally arranged to the central position of the display panel. However, the display panel 103 can be closely placed directly on the UV light outputting panel 104 since the pattern and size of the sealant curing image 201 displayed by the UV light outputting panel 104 are exactly the same as the pattern and size of the sealant 410 which is ready to be cured in the first preferred embodiment of the present invention, thereby the volume occupation of the sealant curing system is further reduced.

The energy dissipation of a system can be effectively reduced since an operating voltage required for the light emitting of the UV-OLED panel is much less than the operating voltage of the UV light source in the traditional sealant curing system.

Moreover, in the first preferred embodiment of the present invention, the UV light produced by the UV-OLED panel has a more uniform distribution on the display panel 103 in comparison to the traditional UV light source since the pattern and size of a UV light emitting area (i.e., the area of the sealant curing image 201) in the UV-OLED panel are the same as the pattern and size of the sealant 410 which is ready to be cured, this is advantageous to diminishing the differences in the amount of UV light irradiating to the different areas of the sealant 410

A second preferred embodiment of the sealant curing system according the present invention is similar to the first preferred embodiment. The second preferred embodiment and the first preferred embodiment are different in that:

The sealant curing system further includes a position correcting device. The position correcting device is used for correcting the relative position of the display panel 103 and the UV light outputting panel 104, so that the shape and position of a projection obtained by projecting the sealant curing image 201 onto the display panel 103 are correspondingly aligned to the shape and position of the sealant 410 of the display panel 103. This is advantageous to preventing the UV light emitted by the UV light outputting panel 104 from irradiating the displaying area of the display panel 103 (i.e., areas other than the area of the sealant 410), thereby avoiding damaging of the displaying area of the display panel 103.

Figure 5:
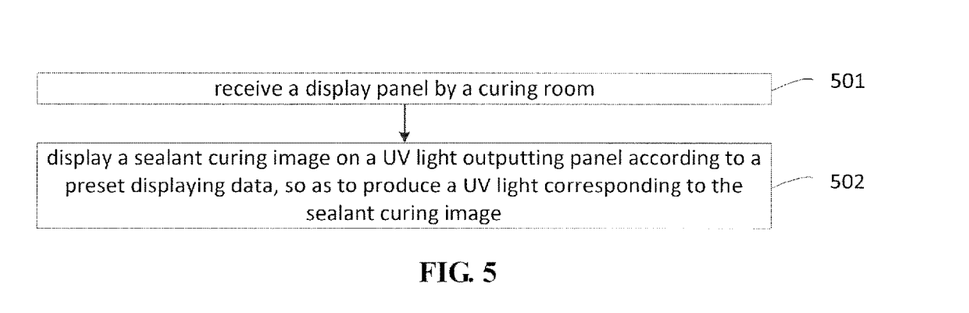
FIG. 5 is a flow chart of a method according to a first preferred embodiment of the present invention for curing a sealant by a sealant curing system.

Please refer to FIG. 5, which is a flow chart of a method according to a first preferred embodiment of the present invention for curing a sealant 410 by a sealant curing system. In the first preferred embodiment of the present invention, the method includes the following steps.

(A) In step 501, the curing room 101 receives the display panel 103.

(B) In step 502, the UV light outputting panel 104 displays the sealant curing image 201 according to a preset displaying data, so as to produce the UV light corresponding to the sealant curing image 201. The UV light is used for irradiating and curing the sealant 410 of the display panel 103. The pattern and size of the sealant curing image 201 correspond to the pattern and size of the sealant 410 of the display panel 103.

Figure 6:
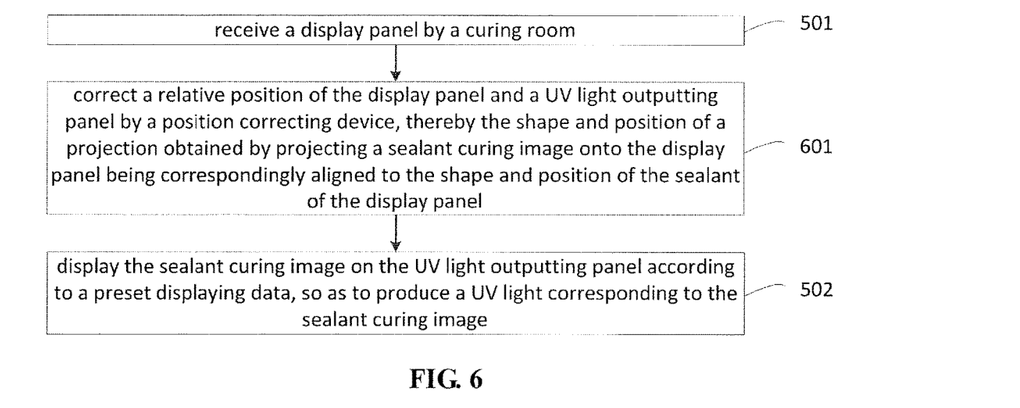
FIG. 6 is a flow chart of a method according to a second preferred embodiment of the present invention for curing a sealant by a sealant curing system.

Please refer to FIG. 6, which is a flow chart of a method according to a second preferred embodiment of the present invention for curing a sealant by a sealant curing system. A second preferred embodiment of the present invention is similar to the first preferred embodiment. The second preferred embodiment and the first preferred embodiment are different in that:

In the second preferred embodiment of the present invention, the method further includes the following step after the step (A) (i.e., step 501) and before the step (B) (i.e., step 502).

(C) In step 601, the relative position of the display panel 103 and the UV light outputting panel 104 is corrected by the position correcting device in the sealant curing system, thereby the shape and position of a projection obtained by projecting the sealant curing image 201 onto the display panel 103 are correspondingly aligned to the shape and position of the sealant 410 of the display panel 103.

In the second preferred embodiment of the present invention, the method further includes the following step before the step (C) (i.e., step 601) or after the step (C) (i.e., step 601).

(D) The display panel 103 is fixed by the fixing member 102 (not shown in the figure).

Figure 7:
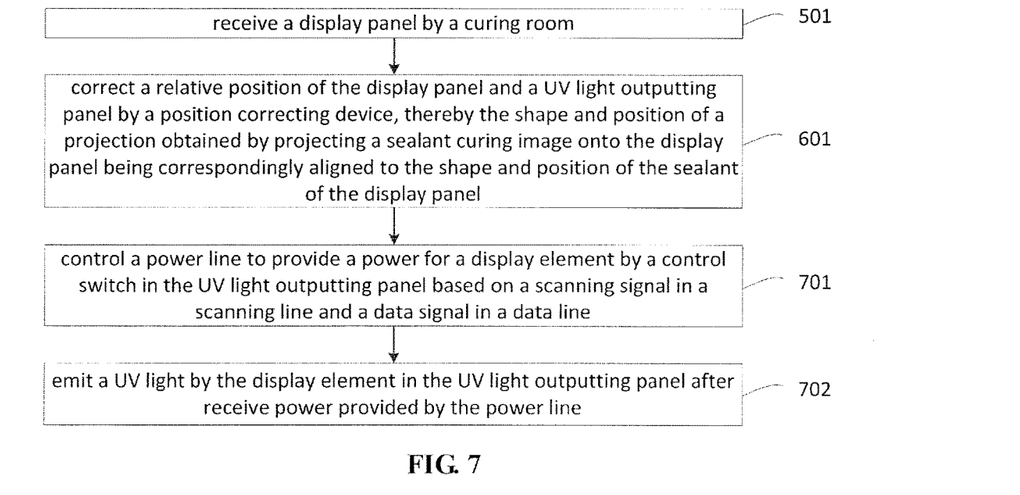
FIG. 7 is a flow chart of a method according to a third preferred embodiment of the present invention for curing a sealant by a sealant curing system.

Please refer to FIG. 7, which is a flow chart of a method according to a third preferred embodiment of the present invention for curing a sealant by a sealant curing system. The present embodiment is similar to the first preferred embodiment or the second preferred embodiment. The first or second preferred embodiment are different from the present embodiment in that:

In the third preferred embodiment of the present invention, the step B (step 502) includes the following step.

The scanning signal and the data signal are received by the pixel unit array, and then the sealant curing image 201 is displayed according to the scanning signal and the data signal, as well as the UV light corresponding to the sealant curing image 201 is produced.

Specifically, the step B (step 502) includes the following steps.

(b1) In step 701, each of the power lines 303 is controlled by the control switch (305 and 306) in the UV light outputting panel 104 to provide power for the display element 304 based on the scanning signal in the scanning line 301 and the data signal in the data line 302.

(b2) In step 702, the display element 304 in the UV light outputting panel 104 emits the UV light after power provided by each of the power lines 303 is received. Specifically, the UV organic emitting material layer 405 emits the UV light when power provided by each of the power lines 303 is received by the display element 304.

Figure 8:
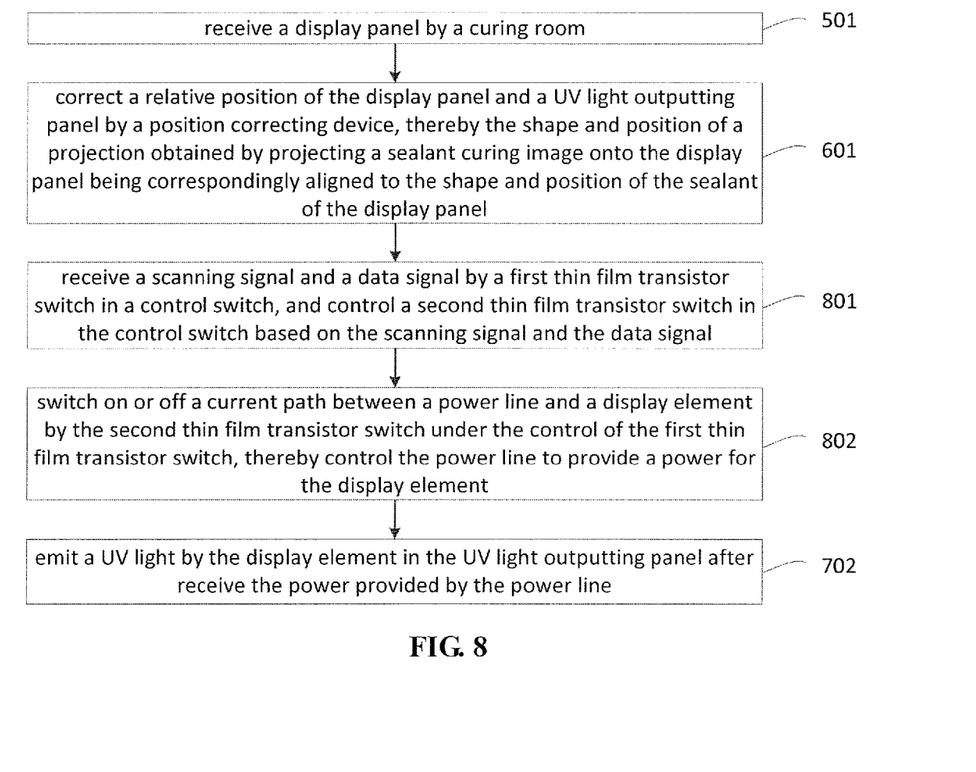
FIG. 8 is a flow chart of a method according to a fourth preferred embodiment of the present invention for curing a sealant by a sealant curing system.

Please refer to FIG. 8, which is a flow chart of a method according to a fourth preferred embodiment of the present invention for curing a sealant by a sealant curing system. A fourth preferred embodiment of the present invention is similar to the third preferred embodiment. The fourth preferred embodiment and the third preferred embodiment are different in that:

In the fourth preferred embodiment of the present invention, the step b1 (step 701) includes the following steps.

(b11) In step 801, the scanning signal and the data signal are received by the first thin film transistor switch 305 in the control switch (305 and 306), and the second thin film transistor switch 306 in the control switch (305 and 306) is controlled according to the scanning signal and the data signal.

(b12) In step 802, the current path between each of the power lines 303 and the display element 304 is switched on or off by the second thin film transistor switch 306 under the control of the first thin film transistor switch 305, thereby controlling each of the power lines 303 to provide power for the display element 304.

By the above technical scheme, any masks are not needed to be provided in a process for curing a sealant, so that the process in which different masks are replaced for the display panels of the different sizes can be eliminated, thereby reducing the processing costs (e.g., the costs of the mask and costs required for restoring to the default environment are reduced) and the processing time (e.g., time required for replacing the mask and time required for restoring to the default environment are saved). In addition, the above technical scheme further is advantageous to diminishing the differences in the amount of UV light irradiating to the different areas of the sealant 410, so that a more uniform UV-irradiation is received by the different areas of the sealant 410.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. With particular regard to the various functions performed by the above described components, the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such a feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A sealant curing system, comprising:
 a curing room used for receiving a display panel having a sealant which is ready to be cured; and
 an ultraviolet light outputting panel disposed in the curing room, wherein the ultraviolet light outputting panel is used for displaying a sealant curing image according to a preset displaying data, so as to produce an ultraviolet light inside an area of the sealant curing image; the ultraviolet light is used for irradiating and curing the sealant of the display panel, and the sealant curing image corresponds to a pattern of the sealant of the display panel;

wherein the ultraviolet light outputting panel comprises:
a scanning line for transferring a scanning signal;
a data line for transferring a data signal;
a pixel unit respectively connected to the scanning line and the data line, the pixel unit being used for displaying the sealant curing image based on the scanning signal and the data signal, as well as producing the ultraviolet light;
the pixel unit comprises:
a display element comprising a negative electrode layer, a positive electrode layer, and an ultraviolet organic emitting material layer disposed between the negative electrode layer and the positive electrode layer; and
a control switch used for driving the display element based on the scanning signal and the data signal;
the sealant curing system further comprises:
a position correcting device, wherein the position correcting device is used for correcting a relative position of the display panel and the ultraviolet light outputting panel, so that a shape and a position of a projection obtained by projecting the sealant curing image onto the display panel are correspondingly aligned to a shape and a position of the sealant of the display panel.

2. The sealant curing system of claim 1, wherein the ultraviolet organic emitting material layer is formed by a method for doping an organic basic material and an ultraviolet light emitting material, and the ultraviolet light emitting material comprises a carbazole-containing ultraviolet light emitting material and/or an ultraviolet light emitting quinquebiphenyl material.

3. The sealant curing system of claim 1, wherein a pattern and a size of the projection obtained by projecting the sealant curing image onto the display panel are the same as a pattern and a size of the sealant which is ready to be cured in the display panel.

4. The sealant curing system of claim 1, wherein the sealant curing image is arranged just right facing to the sealant which is ready to be cured in the display panel, and a pattern and a size of the sealant curing image are the same as a pattern and a size of the sealant which is ready to be cured in the display panel.

5. A sealant curing system, comprising:
a curing room used for receiving a display panel having a sealant which is ready to be cured; and
an ultraviolet light outputting panel disposed in the curing room, wherein the ultraviolet light outputting panel is used for displaying a sealant curing image according to a preset displaying data, so as to produce an ultraviolet light inside an area of the sealant curing image; the ultraviolet light is used for irradiating and curing the sealant of the display panel, and the sealant curing image corresponds to a pattern of the sealant of the display panel.

6. The sealant curing system of claim 5, wherein the ultraviolet light outputting panel comprises:
a scanning line for transferring a scanning signal;
a data line for transferring a data signal; and
a pixel unit respectively connected to the scanning line and the data line, the pixel unit being used for displaying the sealant curing image based on the scanning signal and the data signal, as well as producing the ultraviolet light.

7. The sealant curing system of claim 6, wherein the pixel unit comprises:
a display element comprising:
a negative electrode layer;
a positive electrode layer; and
an ultraviolet organic emitting material layer disposed between the negative electrode layer and the positive electrode layer; and
a control switch used for driving the display element based on the scanning signal and the data signal.

8. The sealant curing system of claim 7, wherein the ultraviolet organic emitting material layer is formed by a method for doping an organic basic material and an ultraviolet light emitting material.

9. The sealant curing system of claim 8, wherein the ultraviolet light emitting material comprises an carbazole-containing ultraviolet light emitting material and/or an ultraviolet light emitting quinquebiphenyl material.

10. The sealant curing system of claim 7, wherein the ultraviolet light outputting panel comprises a power line array, and the power line array comprises at least two power lines; each of the power lines connects the pixel unit, and each of the power lines is used for providing a power for the pixel unit; the control switch is used for controlling each of the power lines to provide power for the display element based on the scanning signal and the data signal; the ultraviolet organic emitting material layer is used for emitting the ultraviolet light when power provided by each of the power lines is received by the display element.

11. The sealant curing system of claim 10, wherein the control switch comprises a first thin film transistor switch and a second thin film transistor switch, the first thin film transistor switch connects the display element, the scanning line, and the data line, and the second thin film transistor switch connects the display element, each of the power lines, and the first thin film transistor switch; the first thin film transistor switch is used for receiving the scanning signal and the data signal, and is used for controlling the second thin film transistor switch based on the scanning signal and the data signal; the second thin film transistor switch is used for switching on or off a current path between each of the power lines and the display element under a control of the first thin film transistor switch, thereby controlling the ultraviolet organic emitting material layer to emit the ultraviolet light.

12. The sealant curing system of claim 5, wherein a pattern and a size of a projection obtained by projecting the sealant curing image onto the display panel are the same as a pattern and a size of the sealant which is ready to be cured in the display panel.

13. The sealant curing system of claim 5, wherein the sealant curing image is arranged just right facing to the sealant which is ready to be cured in the display panel, and a pattern and a size of the sealant curing image are the same as a pattern and a size of the sealant which is ready to be cured in the display panel.

14. The sealant curing system of claim 5, wherein the sealant curing system further comprises:
a position correcting device, wherein the position correcting device is used for correcting a relative position of the display panel and the ultraviolet light outputting panel, so that a shape and a position of a projection obtained by projecting the sealant curing image onto the display panel are correspondingly aligned to a shape and a position of the sealant of the display panel.

15. The sealant curing system of claim 5, wherein the sealant curing system further comprises:
a fixing member disposed in the curing room, the fixing member being used for fixing the display panel.

16. A method of curing a sealant by the sealant curing system of claim 5, comprising the following steps of:
(A) receiving the display panel by the curing room; and
(B) displaying the sealant curing image on the ultraviolet light outputting panel according to a preset displaying data, so as to produce the ultraviolet light inside an area of the sealant curing image, wherein the ultraviolet light is used for irradiating and curing the sealant of the display panel, and the sealant curing image corresponds to a pattern of the sealant of the display panel.

17. The method of curing the sealant by the sealant curing system of claim 16, wherein after the step (A) and before the step (B), the method further comprises the following step of:
(C) correcting a relative position of the display panel and the ultraviolet light outputting panel by a position correcting device in the sealant curing system, thereby a shape and a position of a projection obtained by projecting the sealant curing image onto the display panel being correspondingly aligned to a shape and a position of the sealant of the display panel.

18. The method of curing the sealant by the sealant curing system of claim 17, wherein before the step (C) or after the step (C), the method further comprises the following step of:
(D) fixing the display panel by a fixing member.

19. The method of curing the sealant by the sealant curing system of claim 16, wherein the step B comprises the following steps of:
(b1) controlling a power line to provide a power for the display element by a control switch in the ultraviolet light outputting panel based on a scanning signal in a scanning line and a data signal in a data line; and
(b2) emitting the ultraviolet light by the display element in the ultraviolet light outputting panel after receiving power provided by the power line.

20. The method of curing the sealant by the sealant curing system of claim 19, wherein the step b1 comprises the following steps of:
(b11) receiving the scanning signal and the data signal by a first thin film transistor switch in the control switch, and controlling a second thin film transistor switch in the control switch based on the scanning signal and the data signal; and
(b12) switching on or off a current path between each of the power lines and the display element by the second thin film transistor switch under a control of the first thin film transistor switch, thereby controlling each of the power lines to provide power for the display element.

* * * * *